C. E. PETERSON.
PLOW BEAM BRACE.
APPLICATION FILED NOV. 12, 1920.
1,392,444.
Patented Oct. 4, 1921.
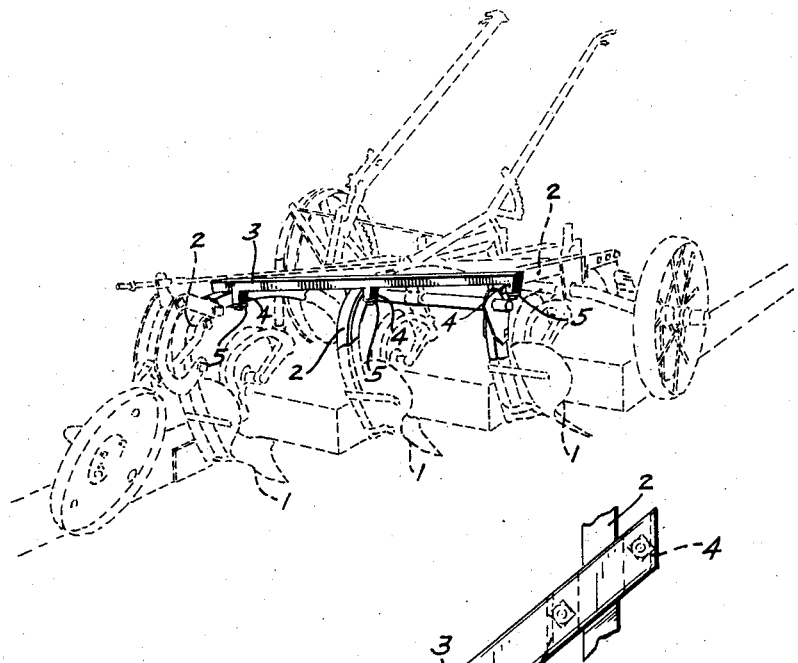
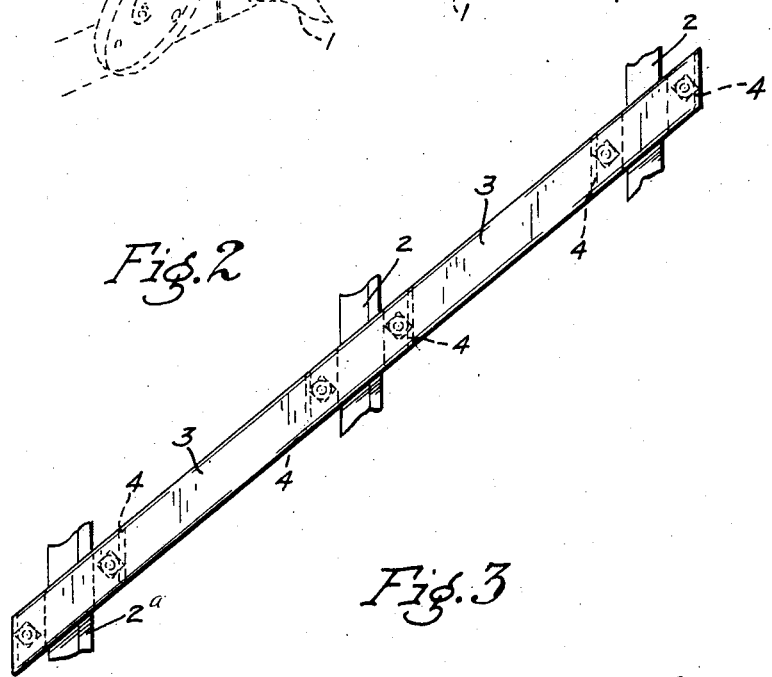
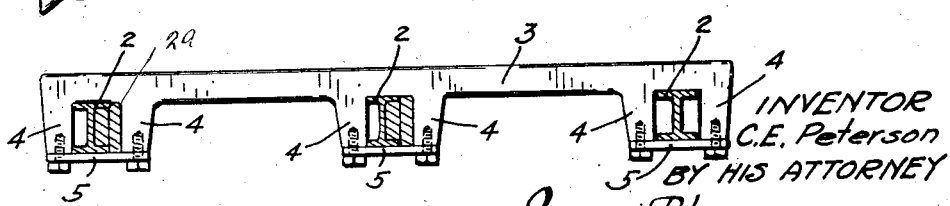
INVENTOR
C.E. Peterson
BY HIS ATTORNEY
James F. Williamson

UNITED STATES PATENT OFFICE.

CARL E. PETERSON, OF KERKHOVEN, MINNESOTA.

PLOW-BEAM BRACE.

1,392,444. Specification of Letters Patent. Patented Oct. 4, 1921.

Application filed November 12, 1920. Serial No. 423,582.

*To all whom it may concern:*

Be it known that I, CARL E. PETERSON, a citizen of the United States, residing at Kerkhoven, in the county of Swift and State of Minnesota, have invented certain new and useful Improvements in Plow-Beam Braces; and I do hereby declare the following to be a full, clear, and exact description of the invention, such as will enable others skilled in the art to which it appertains to make and use the same.

This invention relates to a plow beam brace and is particularly designed to be used with a gang share plow. The different shares of such plows are usually spaced laterally and arranged, one behind the other. It has heretofore been the practice to brace the beam carrying the shares with simple arched braces which were bolted to the beam. These braces have proven inefficient in actual use and the same have become sprung and often broken, resulting in distortion of the plow beams and other parts of the plow when the ground to be broken up has been hard and refractory.

It is an object of this invention, therefore, to provide a strong and simple brace for the beams of such a plow which is adapted to be disposed across the top of the same and hold them in secure spaced relation and to be of such design that it will not be readily broken or dislocated.

With this object in view, the invention consists in the matter described and claimed and illustrated in the accompanying drawings, in which like reference characters refer to the same parts throughout the different views, and in which, Figure 1 shows a standard type of gang plow largely represented in dotted lines and having the novel brace applied thereto;

Fig. 2 is a plan view of the brace also showing part of the plow beams; and

Fig. 3 is a side view of the brace as seen in Fig. 2, showing the plow beam in section.

Referring to the drawings, Fig. 1 illustrates a gang share plow of standard design having the shares 1 carried by the curved plow beams 2. Applicant's novel brace is adapted to extend across the top of said beam at the top of the curved portion thereof and since the shares are disposed, one in front of the other, the brace will extend diagonally across the plow. The brace comprises a heavy longitudinal portion 3 from which depend pairs of spaced lugs 4. The space between the lugs is made just wide enough to tightly fit along the sides of the plow beam whether the same is made from I-beam cross section or of rectangular section, and cap plates 5 are provided to be securely bolted to the lower portions of these lugs 4 by suitable cap screws. The plow beam and brace are thus firmly and rigidly secured together and there is no possibility of lateral or twisting movement of the plow beam. As the brace extends diagonally across said beam, the lugs and the sides of the same thus extend at an angle to the length of the brace, and the ends of the brace are made parallel with the sides of the plow beams. If desired, a filler brace 2ª may be placed along side of the I section or channel section forming the beam to insure a firm engagement of the same with the side of the lug 4, as shown in Fig. 3.

While the brace can be made of any desired material, it is preferably made as a heavy steel forging or casting. The gang plows for which the brace is designed, are subject to heavy duty and are usually drawn by powerful tractors and the brace is, accordingly, made very strong and rugged. It will, of course, be understood that various changes might be made in the form and details of the same without departing from the scope of applicant's invention, which consists in the matter shown and described and set forth in the appended claims.

What I claim is:

1. A plow beam brace for a gang plow comprising a longitudinal member adapted to extend across the beams of said plow at an intermediate point thereof and having pairs of spaced lugs depending therefrom and adapted to tightly embrace said beams, and plates connecting the lugs of each pair bolted thereto and disposed beneath said plow beams, to tightly and rigidly inclose said beam.

2. A plow beam brace comprising a longitudinal member adapted to extend across said beams diagonally and having spaced pairs of lugs depending therefrom adapted to tightly and rigidly inclose said beam, said lugs extending across said longitudinal member at an angle thereto, and clamping plates bolted to the bottom of said lugs.

3. In a gang plow having a plurality of downwardly curved beams, a beam bracing member adapted to extend across the said beams substantially at the highest point thereof and having spaced pairs of angular lugs depending therefrom, a filler piece extending along the sides of said beams between the same and the lugs, and plates bolted to the bottom of the lugs of each pair to tightly and rigidly inclose the said beam.

In testimony whereof I affix my signature in presence of two witnesses.

CARL E. PETERSON.

Witnesses:
O. G. HOUGH,
C. E. MELBYE.